A. S. NICHOLS.
FACTORY SPOOL HOLDER.
APPLICATION FILED FEB. 8, 1909.
945,188.
Patented Jan. 4, 1910.
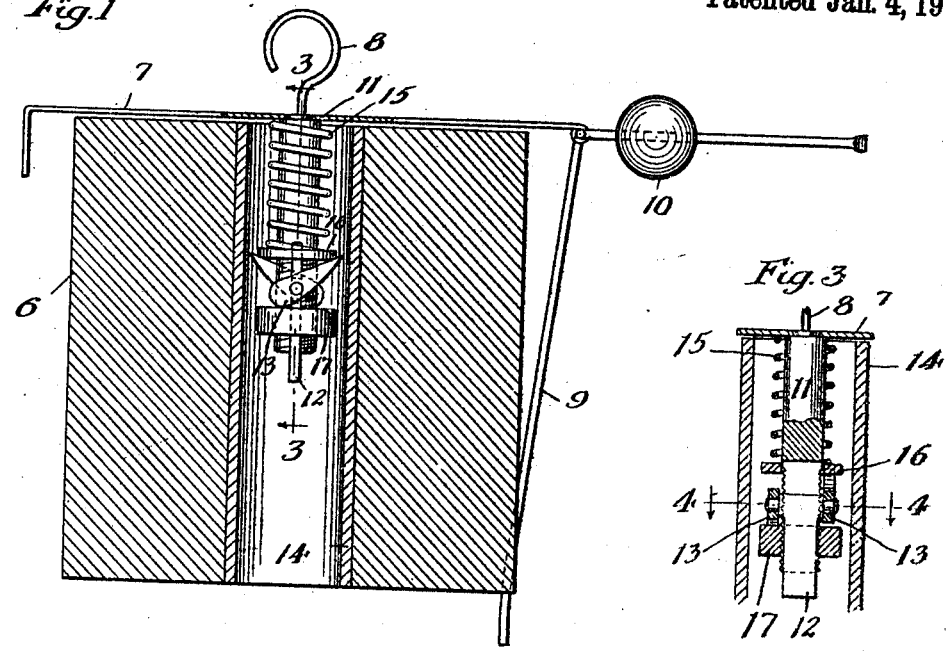
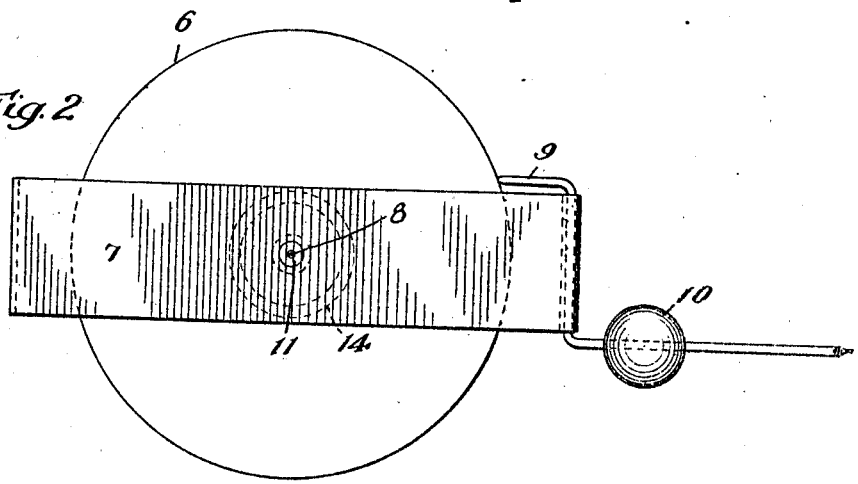
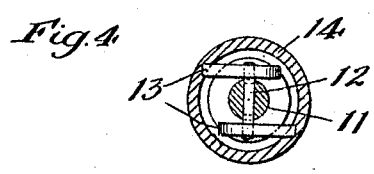
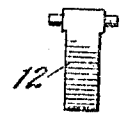
Witnesses:
Wm. Geiger
H. W. Munday
Inventor:
Aaron S. Nichols
By Munday, Evarts, Adcock & Clarke,
Attorneys

UNITED STATES PATENT OFFICE.

AARON S. NICHOLS, OF NEW YORK, N. Y.

FACTORY SPOOL-HOLDER.

945,188.　　　　Specification of Letters Patent.　　Patented Jan. 4, 1910.

Application filed February 8, 1909.　Serial No. 476,634.

*To all whom it may concern:*

Be it known that I, AARON S. NICHOLS, a citizen of the United States, residing in New York, in the county of New York and State of New York, have invented a new and useful Improvement in Factory Spool-Holders, of which the following is a specification.

This invention relates to spool holders for use in factories, and is an improvement upon the holders shown in my Patent No. 902,247 of October 27, 1908. My endeavor in the present invention has been to so construct the device that it can be changed readily to fit spools of different sizes. Like the holders of my said patent, the holder is adapted to lock the spool against removal and can only be removed by rupturing the barrel of the spool after the thread has been drawn off from it.

The nature of my improvement is fully set forth below, and will be understood from the accompanying drawing, in which, Figure 1 is a vertical section of the device and Fig. 2 a plan of the same. Fig. 3 is a section on the line 3—3 of Fig. 1. Fig. 4 is a section on the line 4—4 of Fig. 3 and Fig. 5 shows the device carrying the pivots of the locking dogs, detached.

In the drawing, 6 represents a spool positioned on the holder and in readiness to be locked thereto. The holder consists of a top plate 7 having a suspending wire 8 attached thereto and a guard 9 bearing on the surface of the thread and preventing the too free unwinding of the same. This guard may be provided with a weight 10 if desired, to give it greater efficiency.

Depending from the plate 7 is a post 11 having its lower end forked to give admission to the pivot bearing plate 12, which is inserted from below. Upon the pivots at each side of this plate 12 are mounted locking dogs 13, which, as will be understood from Fig. 1, are pointed and adapted to enter the inner surface of the barrel 14 of the spool and when thus entered, to resist any attempt to withdraw the spool. The dogs are forced into action against the barrel by a spring 15 encircling the post 11 and bearing upon a collar 16 which is movable vertically and bears upon the dogs. The lower portion of the post is threaded exteriorly, and on the same is a circular nut 17. This nut is sufficiently large to nearly fill the bore of the spool barrel so that it prevents any attempt to insert tampering tools within the spool for the purpose of releasing the dogs.

The pivot plate 12 is placed loosely in the fork of the post 11 and is only confined therein by the nut 17 so that in order to adapt the holder to use upon a different sized spool from that shown, it is only necessary to remove the nut 17 and the plate 12 and the dogs, and insert another plate with longer or shorter dogs and another nut 17 of larger or smaller diameter, as the case may be. The tension of the spring 15 may be increased to any extent desired by screwing the nut 17 upward, as thereby the dogs are made to raise the collar 16.

I claim:

1. A spool holder for factory use provided with concealed devices for locking the spool to it, such devices being adapted to be inserted in the bore of the spool, and to engage the wall thereof, and consisting of oppositely directed pivoted dogs, a support therefor and a spring acting on the dogs.

2. A factory spool holder consisting of a plate covering the top of the spool, a depending post attached to said plate, a pair of dogs adapted to engage the inner wall of the spool barrel, the same being pivoted upon a plate loosely inserted in a fork formed at the bottom of the post, a spring bearing down upon said dogs and a nut threaded on the lower end of the post, said dogs and said nut being removable.

3. A spool holder for factory use having means for locking the spool to it against theft, said means consisting of oppositely directed pivoted dogs adapted to engage the barrel of the spool and themselves easily removable from the holder, a support upon which the dogs are pivoted, and a spring for forcing the dogs into engagement with the barrel.

4. A spool holder for factory use having means for locking the spool to it, said means consisting of oppositely directed pivoted dogs adapted to engage the barrel of the spool, a support upon which the dogs are pivoted, a spring for forcing the dogs into engagement with the barrel, and a device below the dogs adapted to prevent tampering with them from below.

AARON S. NICHOLS.

Witnesses:
H. M. MUNDAY,
EDWARD S. EVARTS.